United States Patent [19]

Gibson et al.

[11] 4,003,870
[45] Jan. 18, 1977

[54] POLYMERIC THICKENERS

[75] Inventors: David Vincent Gibson, North Bayswater; Bruce Leary, Frankston, both of Australia

[73] Assignee: Dulux Australia Ltd., Melbourne, Australia

[22] Filed: July 17, 1975

[21] Appl. No.: 596,837

Related U.S. Application Data

[62] Division of Ser. No. 520,897, Nov. 4, 1974, abandoned.

[30] Foreign Application Priority Data

Nov. 21, 1973 Australia .......................... 5723/73

[52] U.S. Cl. ....................................... 260/29.6 RW
[51] Int. Cl.² ................... C08L 33/10; C08L 33/12
[58] Field of Search ............... 260/29.6 RW, 486 B, 260/86.1 R, 86.1 E

[56] References Cited

UNITED STATES PATENTS

| | | | |
|---|---|---|---|
| 3,004,958 | 10/1961 | Berens | 260/86.1 R |
| 3,058,940 | 10/1962 | Rees | 260/86.1 R |
| 3,277,157 | 10/1966 | Stewart et al. | 260/486 B |
| 3,554,953 | 1/1971 | Duchesneau et al. | 260/29.6 RW |
| 3,652,497 | 3/1972 | Junas et al. | 260/86.1 R |
| 3,708,445 | 1/1973 | Junas et al. | 260/86.1 R |
| 3,719,647 | 3/1973 | Hardy et al. | 260/486 B |
| 3,890,292 | 6/1975 | Bohme et al. | 260/86.1 E |
| 3,891,591 | 6/1975 | Chang et al. | 260/29.6 RW |

*Primary Examiner* — M. J. Welsh
*Attorney, Agent, or Firm* — Cushman, Darby & Cushman

[57] ABSTRACT

A group of novel amphipathic copolymers of poly-(ethylene glycol) acrylate or methacrylate and methyl acrylate or methacrylate is disclosed. The copolymers are especially useful as thickeners for aqueous latex paints in which the disperse particles of film-forming polymer have a diameter below 0.5 micron.

6 Claims, No Drawings

POLYMERIC THICKENERS

This is a division of application Ser. No. 520,897 filed Nov. 4, 1974 and now abandoned.

This invention relates to aqueous latex paints and to polymeric thickeners for use therein.

Paints comprising a stable dispersion of particles of synthetic film-forming polymer in an aqueous liquid are commonly referred to as aqueous latex paints or just "latex paints" and the polymer dispersion itself as an aqueous latex. The aqueous liquid can be essentially water but it may comprise a proportion, less than 50% by weight, of water-soluble or water-miscible liquids, for example to improve the freeze-thaw stability of the latex. Further, the aqueous latex is usually pigmented by dispersing therein solid, insoluble, particulate matter, to impart a desired opacity, colour and certain other mechanical properties to a dried film of the paint so-prepared.

We are concerned in this invention, however, not with the general principles of the formation of an aqueous latex paint, but with the control of its rheology. In particular, we disclose improvements in the formulation of aqueous latex paints which provide an unusually attractive balance between storage and application properties and flow of the applied paint film.

If an aqueous latex paint is prepared by dispersing pigment in an aqueous latex without any further adjustment to the rheology of the system it is known that the resultant composition will normally have totally unacceptable rheological properties. For example, the composition will usually have too low a viscosity for effective application to a substrate. It is a common practice to increase the viscosity of the paint by adding to it a thickener, such as a water-soluble salt or ether of cellulose, an ammonium salt of poly (acrylic acid) or poly (vinyl pyrrolidone) at a concentration, of e.g. 0.2 to 20% by weight of the non-volatile content of the paint. In choosing such a thickener, it is usually considered desirable to use a water-soluble thickener of high molecular weight, for example 50,000 to 500,000 in order to strike a satisfactory balance between viscosity increase and water sensitivity of the paint film due to the water-solubility of the thickener. It has been observed that the composition of the thickener can have some important effects on the rheology of the paint other than to increase its viscosity. In Australian Pat. No. 418,151 for example, it is disclosed that unless proper care is exercised in the selection of the thickener, the paint so-produced will have very poor flow characteristics.

Good flow is, however, only one aspect of the rheology of a latex paint which we have now related to the choice of thickener. Preferably, the paint should be sufficiently viscous to avoid serious settling of pigments on storage and to give good pick-up on a brush or roller applicator. It must also meet the counter-requirement of good flow without excessive run-off on application to a substrate. These criteria are characteristic of a thixotropic system, the paint having a relatively high low-shear viscosity, the rate of recovery of low-shear viscosity after subjecting the paint to high shear forces being time-dependent.

We have now discovered that a certain class of amphiphatic polymer which is soluble in water and has a closely defined chemical structure can be used to thicken aqueous latex-paint so as to impart thixotropic characteristics to them.

Accordingly we now disclose an amphipathic polymer which is essentially a copolymer of (a) poly (ethylene glycol) acrylate or methacrylate and (b) methyl acrylate or methacrylate and which is further characterised in that:

1. the poly(ethylene glycol) must have a molecular weight of 500 – 1500, and
2. the weight balance of (a) to (b) is from about 0.7 – 1.0 to 0.5 to 1.0.

In calculating the molecular weight of the poly(ethylene glycol) chain, we include the contribution of the terminal group, which will normally be an alkoxy group, e.g. a methoxy group.

The most satisfactory copolymers for use as thickeners are, as stated above, copolymers of poly(ethylene glycol) acrylate or methacrylate and methyl methacrylate or acrylate. We have noticed, however, that in some instances the presence of a few percent of other monomers in our copolymers, while they usually detract from the thickening efficiency to a degree, may not be entirely unacceptable impurities. Such monomers must not, however, be materials such as acrylic or methacrylic acids, which can form ionizable salts with a base. Thus, we are able to tolerate small quantities of monomers such as acrylamide, ethyl acrylate, butyl methacrylate, and acrylonitrile in our thickener molecules, but we consider these to be no more than acceptable diluents or impurities, the functionally important part of the molecule consisting essentially of poly(ethylene glycol) methacrylate or acrylate as hereinabove defined and methyl methacrylate or acrylate.

The poly(theylene glycol) segments of these polymers provide the hydrophilic parts and the characteristic carbon-carbon addition polymer backbone together with the residues of the comonomer, the lipophilic parts of our amphipathic molecule. Thus, the weight balance of monomer (a) to monomer (b) which in part characterises our class of amphipathic monomers is some indirect indication of the hydrophilic/lipophilic balance (H.L.B. value) of the molecule as a whole. When used as a thickener in a latex paint, we have found that the best results are given when this weight balance is from 0.55/1.0 to 0.5/1.0. To some extent, the ideal balance will be governed by the actual choice of monomers comprising the copolymer and the nature of the paint which it is required to thicken. If, in relation to the paint, the amphipathic polymer is too lipophilic, it may be insoluble therein and if it is too hydrophilic, the thickening efficiency will suffer.

It is a surprising feature of our class of amphipathic molecules that one of its characteristic features, the ability to thicken aqueous latex paints in the manner described hereinunder, is lost not only if the weight balance of component (a) relative to component (b) lies outside of the defined limits, but it is also lost if the molecular weight of the poly (ethylene glycol) lies materially outside of the limits of 500 – 1500.

The amphipathic molecules of this invention can be used as polymeric thickeners to adjust the viscosity of an aqueous latex paint to the desired level. The chemical composition of the film-forming polymeric particles of the latex from which the paint is prepared is not critical, since we are concerned in this invention with the physical problem of changes to the rheology of a dispersion and not to a film-forming process. Thus any of the known film-forming polymers can be used in latex form. However, the size of the disperse particles of film-forming polymer is important and the usefulness of our amphipathic polymers as thickeners is limited to their use in latices of particle diameter below 0.5 micron, where conventional thickeners are known to degrade the flow properties of the latex. The preferred application of this invention is, in fact, to latices the disperse polymer particles of which have a mean diameter of 0.1 micron or less.

The amphipathic polymer is used at a concentration of 0.1 to 15.0% by weight of the latex solids and in order to get the maximum benefit from the unusual rheological characteristics which our polymers can impart to a latex paint, we prefer to adjust their concentration so that the paint has a viscosity of 0.5 – 1.0 poise for brush application and slightly higher for roller application, at the high shear rate of $10^4$ reciprocal seconds. It is characteristic of the thickened latex paint that it will be thixotropic and show unusually good flow out of brush marks. The paint can, of course, be pigmented by having pigment dispersed therein by known means. It is a particularly important feature of our paints thickened in this way that they have acceptable working properties (e.g. lap time) with, compared to normal practice, relatively low glycol levels in the formulation.

The invention is illustrated by the following examples in which all parts are given by weight:

EXAMPLE 1

Preparation of an amphipathic polymer of the invention.

A poly(ethylene oxide) methacrylate, methyl methacrylate copolymer was prepared as follows:

The following components were charged to a reaction vessel fitted with thermometer, stirrer and water condenser.

| | |
|---|---|
| Propylene glycol | 400 parts |
| Acetone | 60 parts |
| Poly(ethylene oxide) methacrylate (mol wt. 970) | 44 parts |
| Methyl methacrylate | 75 parts |
| Azo diisobutyronitrile (ADIB) | 1.4 parts |

The charge was heated to reflux at 95° C and maintained there for 80 minutes. ADIB (0.7 parts) was then added and reflux continued for a further 80 minutes. Three more ADIB additives each of 0.7 parts were made in a similar way at 80 minute intervals and then 80 minutes after the final ADIB addition the acetone was stripped and water (100 parts) added. The final product consisted of a clear solution of an amphipathic polymer and had a solid content of 19.2% by weight. It is referred to hereinafter as Thickener Solution A.

EXAMPLES 2 – 5

Comparative examples of paints showing the desirable rheology obtainable in a latex paint by using an amphipathic polymer of this invention as a thickener.

A common method of preparation for each of the four samples of paint was to prepare a mill-base consisting of titanium dioxide pigment (10 parts) pigment dispersant* (0.2 parts) sodium hexametaphosphate (0.3 parts), antifoam (0.1 parts) and water (3.8 parts) by high-speed dispersion. Then 26.0 parts of an acrylic copolymer latex* having solids of 50.0% by weight and average particle diameter of 0.1 micron was added to millbase. This latex was plasticised with 2.8% (W/W) of tri-n-butyl phosphate prior to its addition to the millbase.

Tamol 731 of Rohm and Haas Co. (Rhoplex and Tamol are Trade Marks)
*Rhoplex AC 61 of Rohm and Haas Co.

The paints were completed by making them up to the compositions shown on the accompanying table, in which the thickeners were as follows:

| | |
|---|---|
| Thickener A | —solution as example 1 (20% by wt. solution). |
| Thickener B | —10% by wt. solution in water of a poly(vinyl alcohol/acetal) thickener as example 6 of Australian patent No. 416,519. |
| Thickener C | —hydroxy ethyl cellulose, degree of substitution 2.5 and viscosity as 1% solution in water, 15–25 poise at 20°C. |

The samples so-prepared were allowed to stand overnight to reach rheological equilibrium before testing. To accelerate this process our preferred method of ageing at 40° C was followed. The samples were then subjected to viscosity and flow testing, with the following results:

| EXAMPLE NO. | 2 | 3 | 4 | 5 |
|---|---|---|---|---|
| Unthickened paint (as above) | 40.3 parts | 40.3 parts | 40.3 parts | 40.3 parts |
| Thickener | nil | 0.2 parts (type C) | 4.0 parts (type B) | 1.2 parts (type A) |
| Water | 4.1 parts | 4.0 parts | 0.2 parts | 3.0 parts |
| Propylene glycol | 1.6 parts | 1.6 parts | 0.9 parts | 0.7 parts |
| 880 Ammonia | 0.13 parts | 0.13 parts | 0.13 parts | 0.13 parts |
| Viscosity (shear rate 10 sec$^{-1}$ using Drage Rheomat) | 2.4 poise | 25.0 poise | 8.0 poise | 27.0 poise |
| Viscosity (shear rate $10^4$ sec$^{-1}$ using cone and plate viscometer) | 0.1 poise | 0.3 poise | 0.8 poise | 0.8 poise |
| Flow (visual rating) | V. good | poor | V. good | V. good |

The results show that at the low rate of shear, which is a measure of brush-loading capacity of a paint, the paints using cellulosic thickener and thickener according to the invention are much superior to the other samples. However, the flow of the paint comprising cellulosic thickener was much inferior to that of the thixotropic paint containing thickener according to the invention. The rate of recovery of viscosity of sample 5 after subjecting it to a shearing force was observed to be relatively slow, while it was almost instantaneous in the case of sample 3.

Similar results to that of example 5 were given by a further sample containing an amphipathic polymer similar to that of example 1 (type A) but in which the poly(ethylene glycol) methacrylate of that example was replaced by poly(ethylene glycol) acrylate of similar molecular weight. The only difference in properties was some detectable fall-off in thickening efficiency.

EXAMPLE 6

Effect of monomer composition on the thickening properties of an amphipathic copolymers.

A series of copolymers as defined hereunder was prepared by the general method of example 1 and the thickening action on paints of each copolymer compared as described in examples 2 – 5. The compositions and results were as follows:

| Sample No. | Monomer (a) | Comonomer (b) | Wt a/b |
|---|---|---|---|
| 1 | PEO* methacrylate mol wt. 350 | methyl methacrylate | 0.6 – 1.0 |
| 2 | PEO* methacrylate mol wt. 1700 | methyl methacrylate | " |
| 3 | PEO* methacrylate mol wt. 970 | methyl methacrylate | 1.0 – 1.0 |
| 4 | " | methyl methacrylate | 0.4 – 1.0 |
| 5 | " | styrene | 0.6 – 1.0 |
| 6 | " | ethyl acrylate | " |
| 7 | " | butyl methacrylate | " |
| 8 | " | 2-ethyl hexyl acrylate | " |
| 9 | " | lauryl methacrylate | " |
| 10 | " | acrylonitrile | " |

*poly(ethylene oxide)

The copolymer No. 4 was insoluble in the paint base and hence had no thickening action. All other copolymers, as evidenced by their performance in the paint, had little, if any thickening action, the completed paints in each case having viscosities not significantly greater than the 'control' paint of example 2.

EXAMPLE 7

Investigation of the effect of some variables on the thickening action of a copolymer according to the invention.

An amphipathic polymer was prepared according to the method of example 1 but replacing the poly(ethylene oxide) methacrylate of that example with another sample which had a molecular weight of 820. This product was then processed into a paint by the general method of example 5 and tested by the methods described therein. The results, shown for comparison against those for example 5, were as follows:

| Example No. | 5 | 7 |
|---|---|---|
| Viscosity (shear rate) 10 sec⁻¹ using Drage Rheomat) | 27.0 poise | 57.0 poise |
| Viscosity (shear rate) 10⁴sec⁻¹ using cone and plate viscometer) | 0.8 " | 0.7 " |

-continued

| Example No. | 5 | 7 |
|---|---|---|
| Flow (visual rating) | V. Good | Good |

It will be seen from these examples that while both paints, which were compositions according to this invention, had satisfactory flow characteristics, the flow characteristics improved with increase in the size of the poly(ethylene oxide) component of the amphipathic polymer. This is consistent with our further observation that the rate of recovery of 'structure' in the compositions after they had been subjected to a shear face, was more rapid than shorten the chain-length of the poly(ethylene oxide) used.

EXAMPLE 8

Significance of latex particle-size on paint properties.

Using the general method of example 5, a series of paints was prepared from three commercial acrylic latices of unknown composition but particle diameter below 0.1 micron, a commercial acrylic latex of unknown composition but particle diameter greater than 1.0 micron, a vinyl acetate homopolymer latex of particle diameter over 1.2 micron and a vinyl acetate copolymer latex (vinyl acetate/2-ethyl hexyl acrylate, molar ratio 80/20) with a particle diameter in excess of 1.0 micron.

All of the paints made from latices with a particle diameter below 0.1 micron produced paints of comparable viscosity characteristics and flow to that of example 5 but the remaining paints, in which the latices had particle diameters exceeding 1.0 micron showed little increase in viscosity over a control sample of unthickened paint prepared from the corresponding latex according to example 2.

We claim:

1. A thickened aqueous latex paint comprising 0.1 to 15.0% by weight of latex solids of an amphipathic polymer in which the disperse particles of film-forming polymer of the latex have a diameter below 0.5 micron, characterised in that the amphipathic copolymer is essentially a copolymer of (a) poly(ethylene glycol) acrylate or methacrylate and (b) methyl acrylate or methacrylate and which is further characterised in that:
   1. the poly(ethylene glycol) must have a molecular weight of 500–1500, and
   2. the weight balance of (a) to (b) is from about 0.7/1.0 to 0.5/1.0.

2. A thickened aqueous latex paint according to claim 1 in which the weight balance of (a) to (b) in the amphipathic copolymer is from 0.55/1.0 to 0.5/1.0.

3. A thickened aqueous latex paint according to claim 1 in which the disperse particles of film-forming polymer have a diameter of 0.1 micron maximum.

4. A thickened aqueous latex paint containing sufficient amphipathic polymer to obtain a viscosity of 0.5 – 1.0 poise, wherein the disperse particles of film-forming polymer of the latex have a diameter below 0.5 micron, and said amphipathic polymer is essentially a copolymer of (a) poly (ethylene glycol) acrylate or methacrylate and (b) methyl acrylate or methacrylate and which is further characterised in that:
 1. the poly(ethylene glycol) must have a molecular weight of 500–1500, and
 2. the weight balance of (a) to (b) is from about 0.7/1.0 to 0.5/1.0.

5. A thickened aqueous latex paint according to claim 4 in which the weight balance of (a) to (b) in the amphipathic copolymer is from 0.55/1.0 to 0.5/1.0.

6. A thickened aqueous latex paint according to claim 4 in which the disperse particles of film-forming polymer have a diameter of 0.1 micron.

* * * * *